(12) United States Patent
Mizuno

(10) Patent No.: US 11,463,596 B2
(45) Date of Patent: Oct. 4, 2022

(54) IMAGE PROCESSING APPARATUS AND METHOD TO READ CARD AND PROVIDE AT LEAST A FUNCION USING SCANNER OR PRINTER FOR IMPROVING USER OPERABILITY

(71) Applicant: CANON KABUSHIKI KAISHA, Tokyo (JP)

(72) Inventor: Takafumi Mizuno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/211,334

(22) Filed: Mar. 24, 2021

(65) Prior Publication Data
US 2021/0306490 A1     Sep. 30, 2021

(30) Foreign Application Priority Data
Mar. 31, 2020   (JP) .............................. JP2020-063781

(51) Int. Cl.
*H04N 1/44*   (2006.01)
*H04N 1/00*   (2006.01)

(52) U.S. Cl.
CPC ..... *H04N 1/00517* (2013.01); *H04N 1/00411* (2013.01); *H04N 1/00474* (2013.01); *H04N 1/4433* (2013.01); *H04N 1/00965* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2007/0220269 | A1* | 9/2007 | Suzuki | H04N 1/00973 713/172 |
| 2008/0256459 | A1* | 10/2008 | Sekiya | G06F 21/32 715/741 |
| 2010/0071047 | A1* | 3/2010 | Kawano | H04N 1/4426 726/9 |
| 2014/0268203 | A1* | 9/2014 | Saotome | H04N 1/00408 358/1.13 |
| 2014/0376029 | A1* | 12/2014 | Itoh | G06F 21/608 358/1.14 |
| 2015/0381839 | A1* | 12/2015 | Adachi | H04N 1/00225 358/474 |
| 2018/0107438 | A1* | 4/2018 | Takeuchi | G06F 3/1298 |

FOREIGN PATENT DOCUMENTS

JP   2018186517 A   11/2018

* cited by examiner

*Primary Examiner* — Haris Sabah
(74) *Attorney, Agent, or Firm* — Canon U.S.A., Inc. I.P. Division

(57) ABSTRACT

According to various embodiments of the present disclosure, it is possible to present on a home screen or an application screen such a display that an appropriate favorite setting for each of the home screen and the application screen is applied to the respective home screen or the respective application screen according to read card information.

8 Claims, 18 Drawing Sheets

FIG.6

| FAVORITE ID 601 | FUNCTION 602 | SETTINGS 603 |
|---|---|---|
| F0001 | COPY | THE NUMBER OF COPIES: 1, THE N-IN-1 SETTING: 2-IN-1, THE TWO-SIDED PRINTING SETTING: TWO-SIDED, AND THE COLOR SETTING: MONOCHROME |
| F0005 | SCAN AND TRANSMIT | THE FORMAT: JPEG, THE TRANSMISSION DESTINATION: SMB\\172.20.83.168\FOLDER, AND THE RESOLUTION: 400 DPI |
| ...... | ...... | ...... |

610 — F0001 row
611 — F0005 row

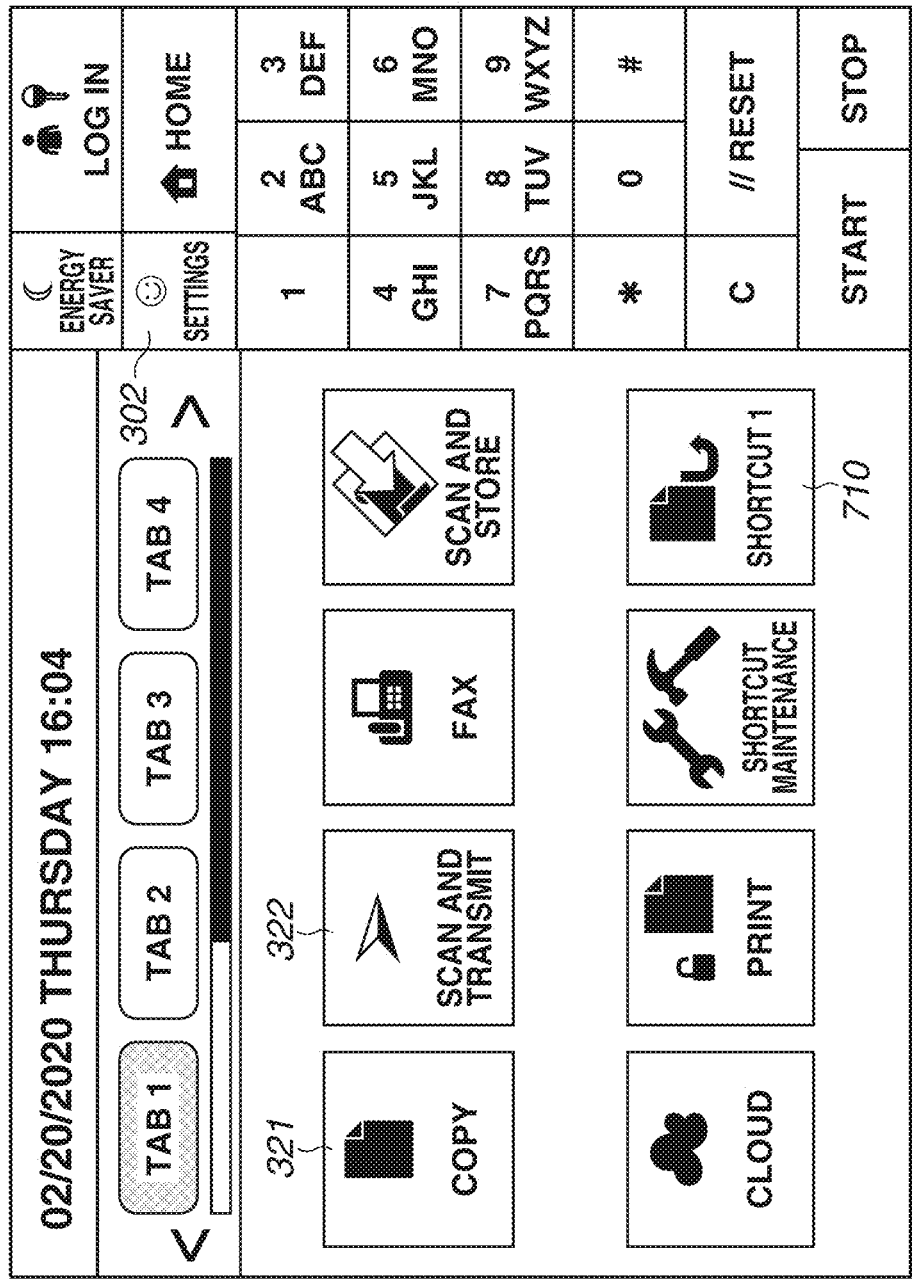

FIG.8

| SHORTCUT ID 801 | FUNCTION 802 | RECALL FAVORITES 803 | LOCATION 804 |
|---|---|---|---|
| S0001 | COPY | F0001 | TAB 1:8 |
| S0019 | FAX | F0008 | TAB 3:5 |
| ⋮ | ⋮ | ⋮ | ⋮ |

| CARD ID | SHORTCUT ID |
|---|---|
| 03BAF394AE277C80 | S0001 |
| 0AE6BCC429D83E32 | S0032 |
| ⋮ | ⋮ |

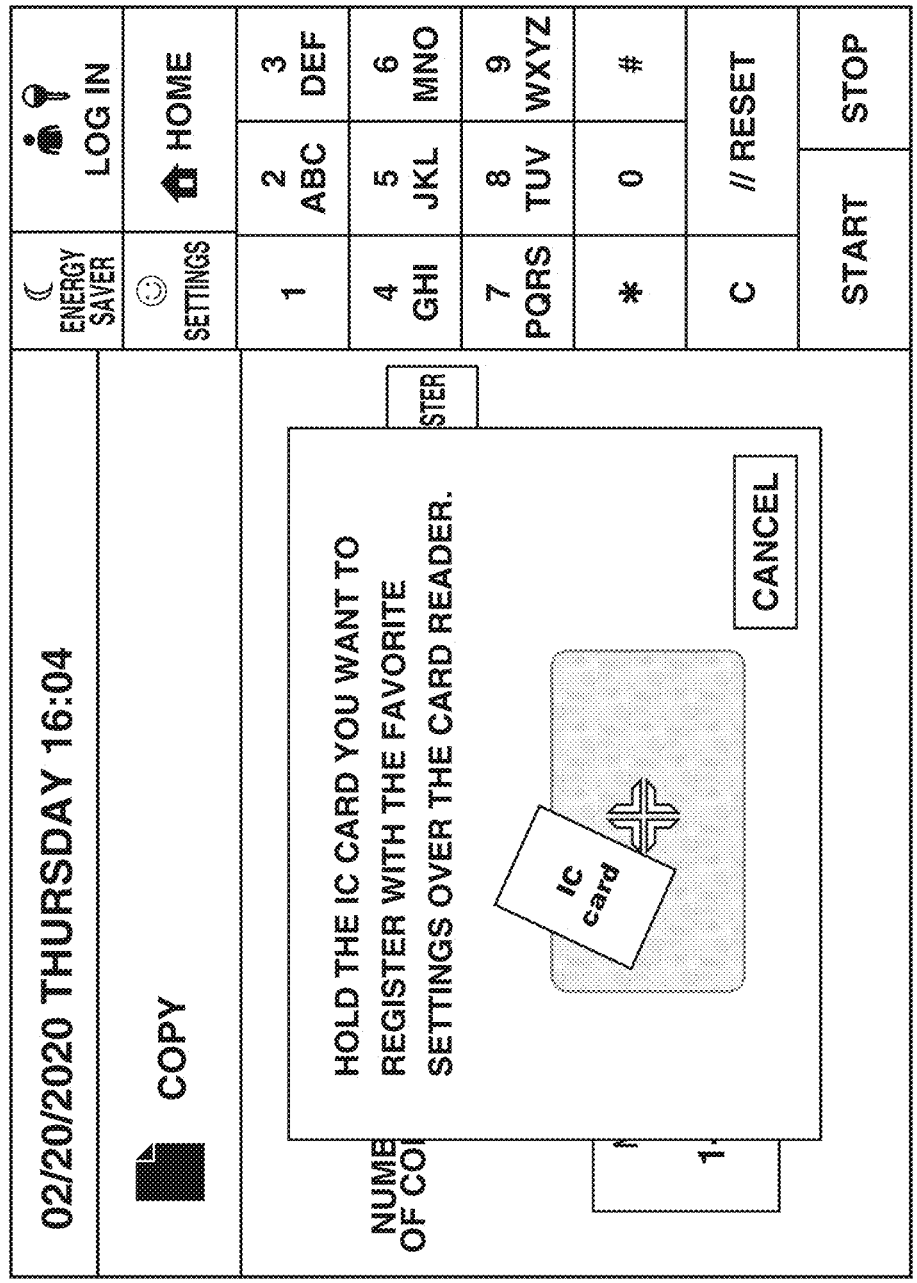

FIG.12

| CARD ID | FAVORITE ID | FUNCTION |
|---|---|---|
| 03BAF394AE277C80 | F0001 | COPY |
| 0AE6BCC429D83E32 | F0005 | SCAN AND TRANSMIT |
| ⋮ | ⋮ | ⋮ |

2

IMAGE PROCESSING APPARATUS AND METHOD TO READ CARD AND PROVIDE AT LEAST A FUNCION USING SCANNER OR PRINTER FOR IMPROVING USER OPERABILITY

BACKGROUND

Field

The present disclosure relates to a technique for improving operability of an image processing apparatus.

Description of the Related Art

A combination of a function (an application) of an image processing apparatus, such as a printer, a scanner, or a multifunction peripheral (MFP), and a plurality of setting values regarding this function (a shortcut) may be managed in association with user information. Even when the MFP does not support the user management, the shortcut may be managed in association with card information (for example, a serial number or a card identification (ID)) of an arbitrary integrated circuit (IC) card. In this case, the shortcut associated with the card information can be easily recalled by the MFP reading this card (Japanese Patent Application Laid-Open No. 2018-186517). If the MFP is configured to limit the association between the card information and the shortcut so as to permit it to be managed only in a one-on-one manner, this may undesirably serve as a constraint on the usability, the operability, and the like of the shortcut for users. Further, for example, if the image processing apparatus is configured to limit the shortcut so as to allow the shortcut to be recalled based on the card information only when a predetermined screen is displayed, this may also undesirably serve as a constraint for users.

Especially, in a case where the MFP is designed to provide a plurality of functions (applications), and a user wants to prepare the shortcut including a favorite setting function by function, it could be said that the constraints imposed on a user by these limitations is considerable.

SUMMARY

According to various embodiments of the present disclosure, an image processing apparatus configured to be able to read card information from a card and provide at least a function using a scanner or a function using a printer includes a display device, wherein a home screen can be displayed on the display device, the home screen including a button for selecting a screen for a function provided by the image processing apparatus, at least one memory storing instructions, and at least one processor executing the instructions causing the information processing apparatus to: manage a combination of the function provided by the image processing apparatus and a setting value group used in the function as first information in association with the card information, manage a combination of the function provided by the image processing apparatus and a setting value group used in the function as second information in association with the card information, and perform display control on the display device, wherein first control is performed as the display control in a case where the card information managed as the first information is read while the home screen is displayed, the first control being configured to display the screen for the function corresponding to the card information in a state that the corresponding setting value group is applied to the displayed screen, and wherein second control is performed as the display control in a case where the card information managed as the second information is read while the screen for the function provided by the image processing apparatus is displayed, the second control being configured to display the screen after updating the currently displayed screen into a state that the setting value group corresponding to the card information is applied to the displayed screen.

Further features will become apparent from the following description of exemplary embodiments with reference to the attached drawings.

BRIEF DESCRIPTION OF THE DRAWINGS

FIG. 6 illustrates a favorite management table.
FIGS. 7A and 7B illustrate registration of a shortcut.
FIG. 8 illustrates a shortcut management table.
FIG. 10 illustrates an IC card management table.
FIGS. 11A and 11B illustrate registration of favorite settings with the IC card.
FIG. 12 illustrates a favorite-IC card management table.

DESCRIPTION OF THE EMBODIMENTS

In the following description, representative exemplary embodiments for implementing various embodiments of the present disclosure will be described with reference to the drawings.

Figure 1:
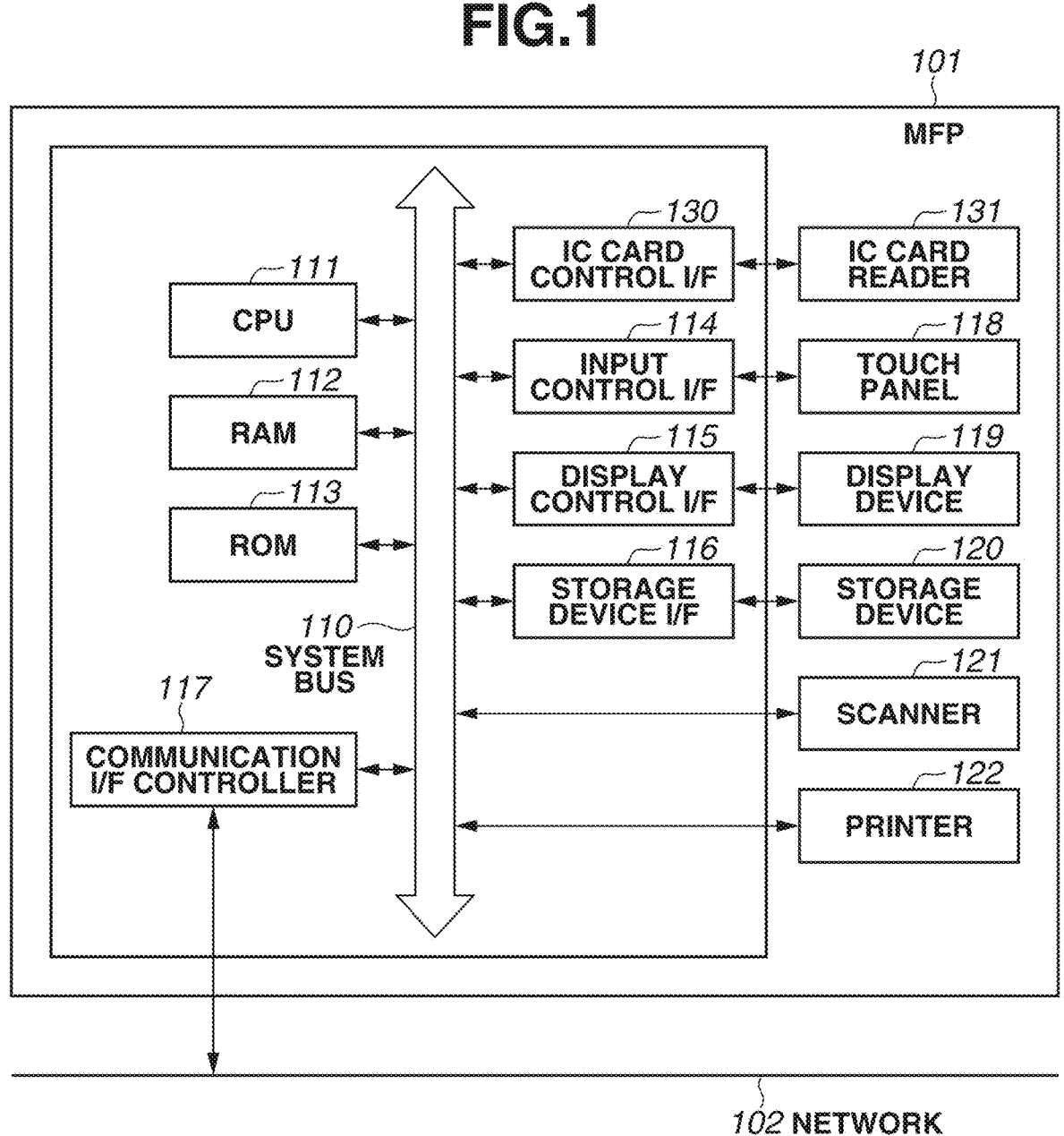
FIG. 1 illustrates a controller unit of a multifunction peripheral (MFP).

FIG. 1 illustrates an example of the hardware configuration of a multifunction peripheral (MFP) 101. FIG. 1 illustrates an example for facilitating the description of a first exemplary embodiment, and it is apparent that the MFP 101 may include another constituent component or may be configured in a different manner as long as being configured to be able to achieve similar advantageous effects to the present exemplary embodiment.

A central processing unit (CPU) 111, a random access memory (RAM) 112, a read only memory (ROM) 113, an input control interface (I/F) 114, a display control I/F 115, a storage device I/F 116, and a communication I/F controller 117 are connected to a system bus 110. Further, a scanner 121 and a printer 122 are also connected to the system bus 110. Each of the units connected to the system bus 110 is configured to be able to exchange data between each other via the system bus 110.

The CPU 111 is a device that controls each device and calculates/processes data. The RAM 112 is a volatile memory, and is used as a temporary storage area, such as a main memory and a work area of the CPU 111. The ROM 113 is a nonvolatile memory, and stores image data, other data, various kinds of programs used for the CPU 111 to operate, and the like in respective predetermined areas. The CPU 111 controls each unit of the MFP 101 using the RAM 112 as the work memory according to a program stored in, for example, the ROM 113. The program used for the CPU 111 to operate is not limited to being stored in the ROM 113, and may be stored in a storage device 120.

The input control I/F 114 receives a user operation, generates a control signal according to the operation, and supplies it to the CPU 111. For example, the input control I/F 114 is connected to a non-illustrated character information input device such as a keyboard and non-illustrated hardware keys for directly inputting a numerical value and the like, a pointing device such as a touch panel 118, or the like, as an input device that receives the user operation. The touch panel 118 is, for example, an input device configured to output coordinate information according to a position touched on an input unit configured in a planar manner. In the following description, the present exemplary embodiment will be described assuming that the user operation is an operation on the touch panel, but it is apparent that the user operation is not limited thereto. The CPU 111 controls each unit of the MFP 101 according to a program based on the control signal generated and supplied by the input control I/F 114 according to the user operation performed on the input device. By this control, the CPU 111 can cause the MFP 101 to function according to the user operation.

The display control I/F 115 outputs a display signal for causing an image to be displayed to a display device 119. For example, the CPU 111 supplies a generated display control signal to the display control I/F 115 according to a program. The display control I/F 115 generates the display signal based on the display control signal and outputs it to the display device 119. For example, the display control I/F 115 displays a graphical user interface (GUI) screen forming a GUI on the display device 119 based on the display control signal generated by the CPU 111. Further, the touch panel 118 may be configured integrally with the display device 119. For example, the touch panel 118 is configured in such a manner that a light transmittance thereof does not disturb the display on the display device 119, and is mounted on the top layer of the display surface of the display device 119. Then, an input coordinate on the touch panel 118 and a display coordinate on the display device 119 are associated with each other. This configuration can construct a GUI that appears as if the user can directly operate a screen displayed on the display device 119.

The storage device 120, such as a hard disk drive (HDD) or a flash memory, is connected to the storage device I/F 116. Data is read out from the storage device 120 and data is written into the storage device 120 based on the control by the CPU 111. The storage device 120 may be used instead of the RAM 112 or the ROM 113.

The communication I/F controller 117 is in charge of communication with various kinds of networks of a local area network (LAN), the Internet, wired communication, wireless communication, and the like based on the control by the CPU 111. Various apparatuses, such as a personal computer (PC), another MFP, a printer, and a server, are connected to the network 102 communicably with the MFP 101. Further, a connection to an external authentication server, which will be described below, is also established via the communication I/F controller 117.

The scanner 121 reads a document and generates image data based on the control by the CPU 111. For example, the CPU 111 causes the scanner 121 to perform scan processing according to a user's instruction input via the input control I/F 114. The scanner 121 reads the document placed on a document positioning plate or an automatic document feeder (ADF), converts it into digital data, and generates the image data. Then, the scanner 121 stores the generated image data into the storage device 120 via the storage device I/F 116.

The printer 122 performs processing for printing the image data stored in the storage device 120 based on the control by the CPU 111. For example, the CPU 111 causes the printer 122 to perform the print processing according to a user's instruction input via the input control I/F 114 or an instruction of a command input from the external apparatus via the communication I/F controller 117. The printer 122 reads out the image data from the storage device 120, converts it into data in a printable data format, and prints it on a paper document.

An integrated circuit (IC) card control I/F 130 outputs a signal for instructing an IC card reader 131 to read an IC card. As will be used herein, the IC card in the present exemplary embodiment refers to a noncontact IC card used for Near Field Communication (NFC) or the like. For example, the CPU 111 supplies a generated IC card control signal to the IC card control I/F 130 according to a program. The IC card control I/F 130 generates an IC card reading signal based on this control signal and outputs it to the IC card reader 131. The IC card reader 131 reads in information in the IC card held over the IC card reader 131, and outputs a signal indicating the reading result to the IC card control I/F 130.

Figure 2:
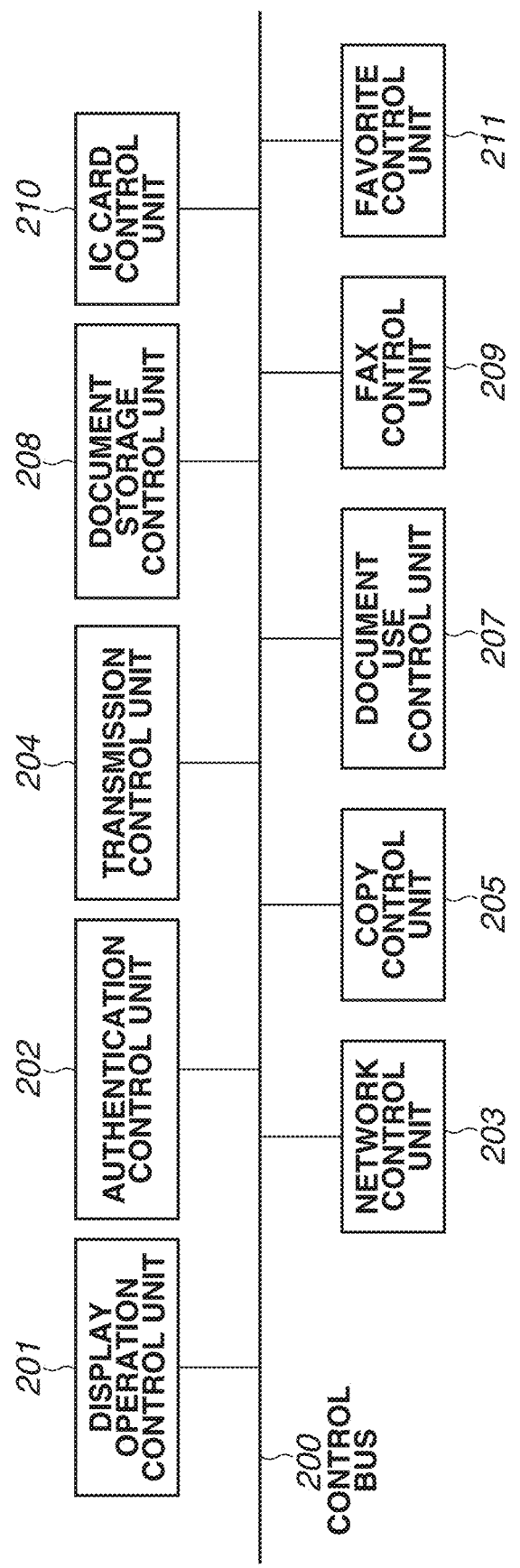
FIG. 2 illustrates a program configuration of the MFP.

The software configuration of the MFP 101 will be described with reference to FIG. 2. FIG. 2 illustrates an example for facilitating the description of the present exemplary embodiment, and it is apparent that the MFP 101 may, for example, include another constituent component or be configured to be able to achieve similar advantageous effects to the present exemplary embodiment. A program for realizing each control unit illustrated in FIG. 2 is stored in the ROM 113, and is loaded into the RAM 112 and executed by the CPU 111 as necessary such as when the MFP is started up or a function is used.

Control units, such as a display operation control unit 201, an authentication control unit 202, and a network control unit 203, is connected to a control bus 200. The control bus 200 receives and provides information between these control units based on the control by the CPU 111. For example, the control bus 200 receives instruction information input by the user from the display operation control unit 201, and stores it into the RAM 112 first. Further, display information from each control unit is received via the control bus 200, and is displayed on the display device 119. The network control unit 203 performs processing for connecting to the external apparatus in the network 102 using the communication I/F controller 117.

Further, the MFP 101 has one or more function(s) such as copying and scanning, and includes a control unit for each function. FIG. 2 illustrates a transmission control unit 204, a copy control unit 205, a document use control unit 207, a document storage control unit 208, and a facsimile (FAX) control unit 209 as examples. Needless to say, it is apparent that the MFP 101 may have a function regarding processing of the MFP 101 other than the functions illustrated in FIG. 2, and include a control unit thereof.

The display operation control unit 201 controls the input control I/F 114 and the display control I/F 115 based on the control by the CPU 111. For example, the display operation control unit 201 presents a display on the display device 119 via the display control I/F 115 based on an instruction from another control unit, or acquires information input by the user onto the touch panel 118 via the input control I/F 114. The display operation control unit 201 notifies each control unit of acquired information via the control bus 200 as necessary. In the following description, assume that information and data are transmitted via the control bus 200 when being provided and received between the control units.

The authentication control unit 202 performs authentication processing for identifying the user according to information input using a manual input, the IC card, or the like based on the control by the CPU 111. For example, when the input information is registered with a system or the MFP 101 as a user of the MFP 101 in advance, the authentication succeeds. Starting a session for the successfully authenticated user after the authentication processing is performed will be referred to as a login.

Further, the authentication control unit 202 controls a non-illustrated user information database storing user information in the storage device 120. The authentication control unit 202 may be configured to not only use the user information database inside the MFP 101 but also use the result of authentication by the external authentication server by connecting to the external authentication server via the communication I/F controller 117. Further, ending the session of the user after the user uses the MFP 101 will be referred to as a logout.

The transmission control unit 204 scans the document from the scanner 121 and converts the scanned document into data in a predetermined file format. The transmission control unit 204 transmits the document to, for example, an electronic mail server in the network 102 via the network control unit 203 using a protocol of an electronic mail or the like. An example using the transmission control unit 204 is a scan and transmission application.

The copy control unit 205 scans the document from the scanner 121, performs specified processing such as stapling, and outputs the result thereof at the printer 122. An example using the copy control unit 205 is a copy application.

The document use control unit 207, for example, prints a document stored in an external file server, the HDD in the MFP 101, a memory medium, a cloud storage, or the like, or presents a preview of it at the MFP 101. In the case where the document in the HDD of the MFP 101 or the memory medium is used, the document use control unit 207 performs processing by accessing the storage device via the storage device I/F 116 and acquiring specified document. In the case of the external file server or the storage in the cloud, the document use control unit 207 acquires the document from the storage destination in the network 102 via the network control unit 203 using an appropriate protocol. For example, when printing the document, the document use control unit 207 outputs the acquired document at the printer 122.

The document storage control unit 208 scans the document from the scanner 121 and converts the scanned document into data in a predetermined file format, similarly to the transmission control unit 204. The document storage control unit 208 stores the document file into a file server in the network 102 via the network control unit 203 using a communication protocol such as Server Message Block (SMB). The document storage control unit 208 can store the document file into not only the file server but also the HDD in the MFP 101, the memory medium such as a Universal Serial Bus (USB) memory, or the storage in the cloud. In the case of the HDD in the MFP 101 or the memory medium, the document storage control unit 208 stores the document by accessing the storage device via the storage device I/F 116. In the case of the external file server or the storage in the cloud, the document storage control unit 208 stores the document into the storage destination in the network 102 via the network control unit 203 using an appropriate protocol. Examples using the document use control unit 207 and the document storage control unit 208 include a scan and storage application and a cloud application.

The FAX control unit 209 scans the document from the scanner 121 and converts the scanned document into data in an image format. The FAX control unit 209 transmits the document to a transmission destination via the network control unit 203 according to a FAX transmission protocol such as known G3 using a public telephone network, an Internet connection, or the like. An example using the FAX control unit 209 is a fax application.

An IC card control unit 210 accesses the IC card reader 131 to read the information in the IC card via the IC card control I/F 130, and returns the reading result to a control unit that is the request source. A unique number specific to the IC card, which is written in the IC chip, is recorded in the IC card information, and hereinafter will be referred to as a card ID.

A favorite control unit 211 manages favorite settings frequently used in each application such as copying, which will be described below, a setting of recalling of the favorite settings from a home screen, and a setting of association with the IC card.

(Home Screen)

Figure 3:
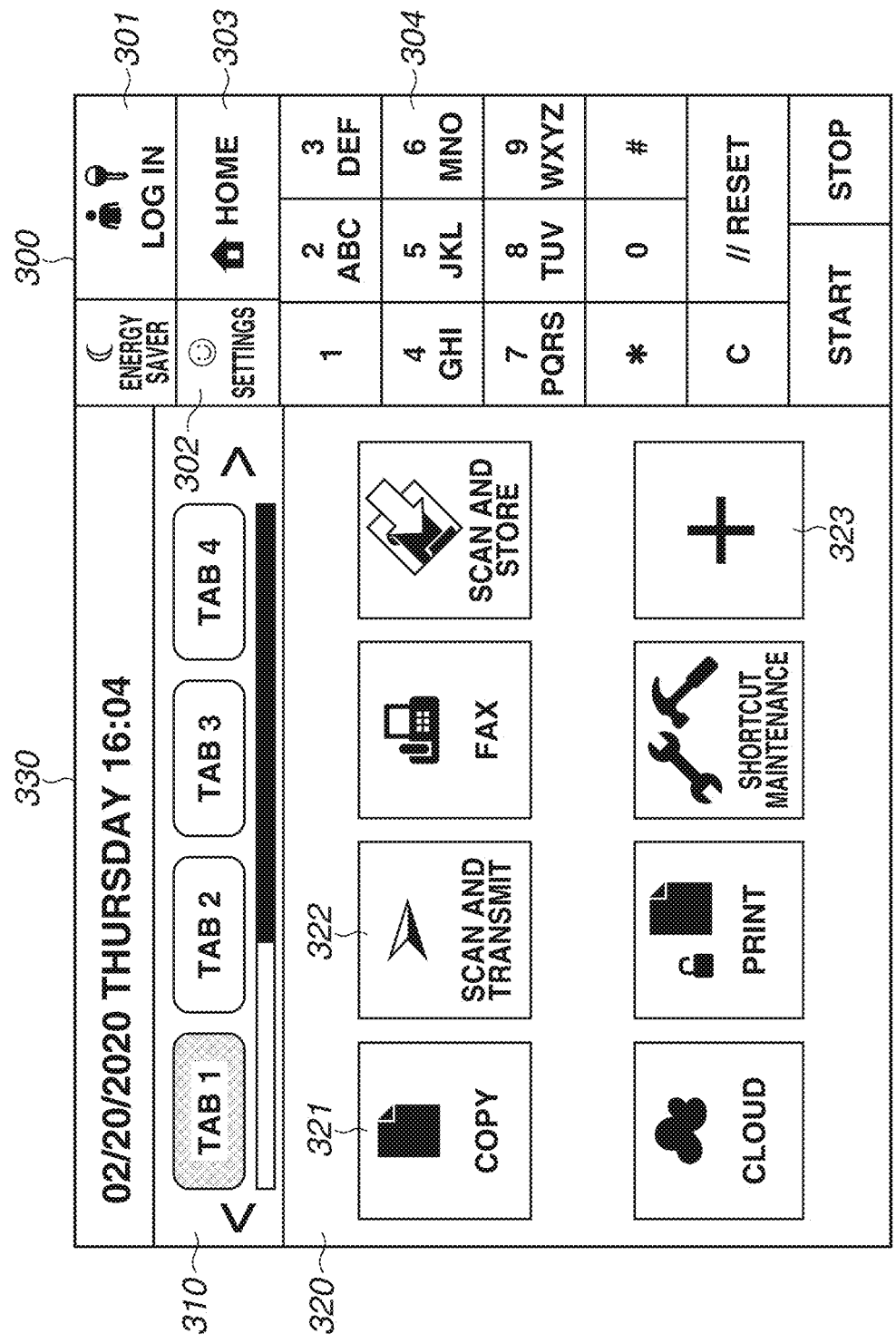
FIG. 3 illustrates a home screen.

FIG. 3 illustrates an example of the home screen displayed on the display device 119 of the MFP 101. The home screen is an initial screen displayed when the MFP 101 is used. The user can, for example, select and execute each function (application), configure a setting, and request the authentication from the home screen.

The home screen includes four regions, namely, a control region 300, a tab region 310, a selection region 320, and an information region 330. The tab region 310, the selection region 320, and the information region 330 are changed according to each function (application) in execution, but the control region 300 is constantly displayed regardless of the function in execution. The control region 300 includes a login button 301 for logging into the MFP 101, a setting button 302 for displaying a setting screen, and a home button 303 for returning from the screen of the function in execution to the home screen. Further, the control region 300 includes buttons such as a keypad 304 for inputting a numerical value and the like. The MFP 101 allows the user to select each function (application) and perform an operation even in a state where the user does not log in using the login button 301.

The tab region 310 includes tabs for switching a plurality of selection regions 320, and a screen corresponding to each tab is displayed in the selection region 320. For example, in the example illustrated in FIG. 3, a tab 1 is selected and a screen corresponding to the tab 1 is displayed in the selection region 320. When another tab is selected, another screen corresponding to this tab is displayed in another selection region 320, although this is not illustrated.

The selection region 320 includes a plurality of buttons for executing the functions. For example, in FIG. 3, the selection region 320 includes buttons such as a copy button 321 for executing the copy function, and a scan and transmission button 322 for executing the scan and transmission function. When any of these function execution buttons is operated, the screen of the application corresponding to the selected function is displayed in the portions of the tab region 310 and the selection region 320. For example, the screen of the copy application is displayed when the copy function is executed, and the screen of the scan and transmission application is displayed when the scan and transmission function is executed. Further, the screen displayed in these regions is not limited to the screen of the application, and a screen corresponding to the selected function is displayed in the tab region 310 and the selection region 320. For example, a non-illustrated screen for setting the MFP 101 is displayed when the setting button 302 is operated.

A "+" button 323 is displayed as a button corresponding to a function not registered yet in the selection region 320. The user can, for example, register a button of a function added by installing a new application into the MFP 101, or register a button corresponding to each shortcut, which will be described below, at a portion where "+" is displayed in the selection region 320.

The information region 330 is a region for notifying the user of information, such as displaying the current time like the example illustrated in FIG. 3, and displaying an error message when an error has occurred.

(Application Screen)

Figure 4:
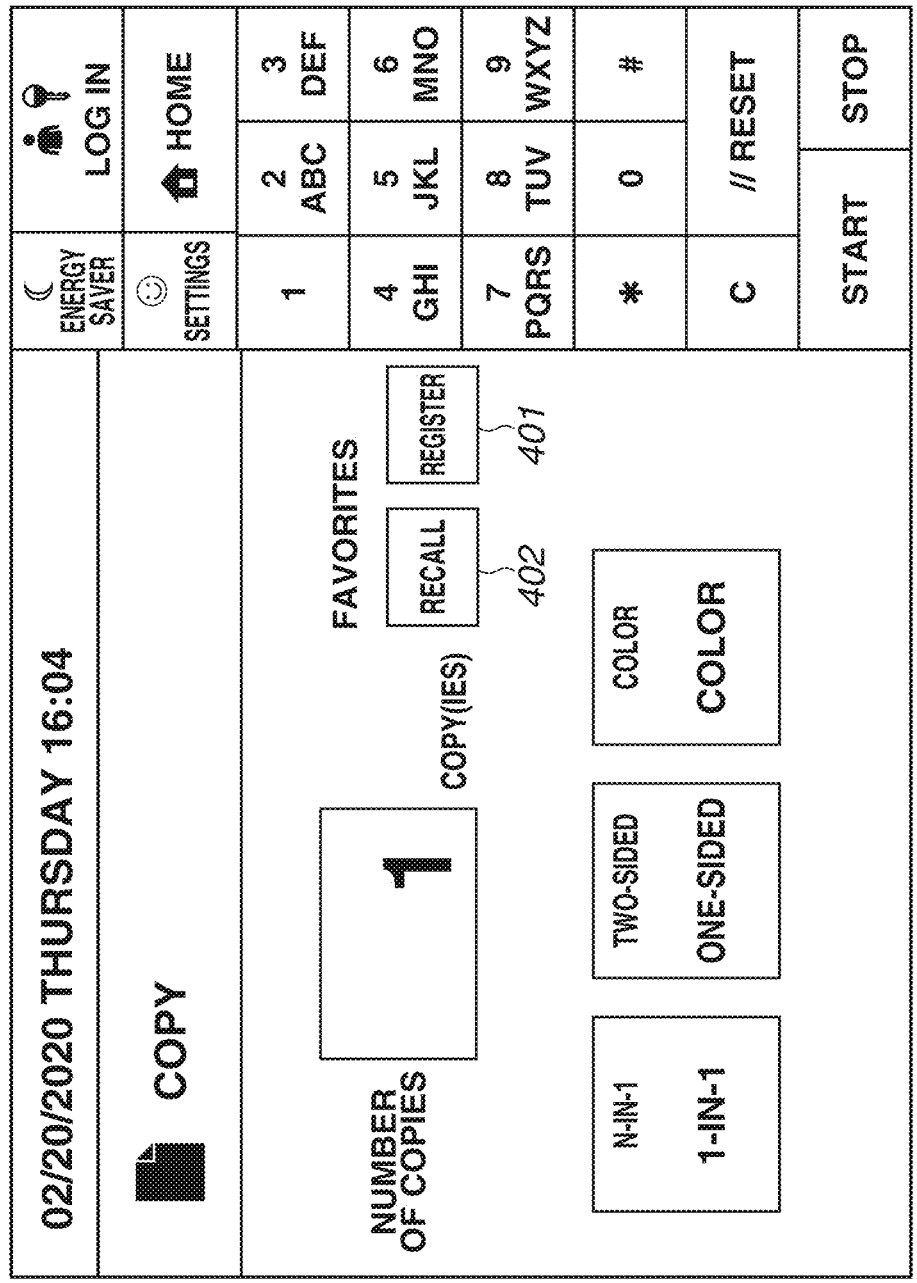
FIG. 4 illustrates a copy screen.

FIG. 4 illustrates a display example of the copy screen for the copy application displayed when the copy button 321 is selected.

In FIG. 4, the copy screen includes setting buttons for a setting of the number of copies for specifying the number of copies to print, an n-in-1 setting for specifying the number of pages placed on one sheet, and the like. In addition thereto, the copy screen includes a two-sided printing setting button for specifying whether the intended printing is one-sided printing or two-sided printing, and a color setting button for specifying in which mode the printing is carried out, in color, in monochrome, or in gray-scale. The currently set value ("one-sided", "color", or the like) is displayed at each setting button. When each setting button in the application is operated, a screen for changing the corresponding setting value is displayed, and the setting can be changed thereon.

The screen will be displayed in a state that a default setting value group managed by the MFP 101 is applied thereto on the screen of each application displayed before the user changes the settings immediately after the button corresponding to each function is selected from the home screen illustrated in FIG. 3. Such a display is not limited to the copy button 321.

Figure 5:
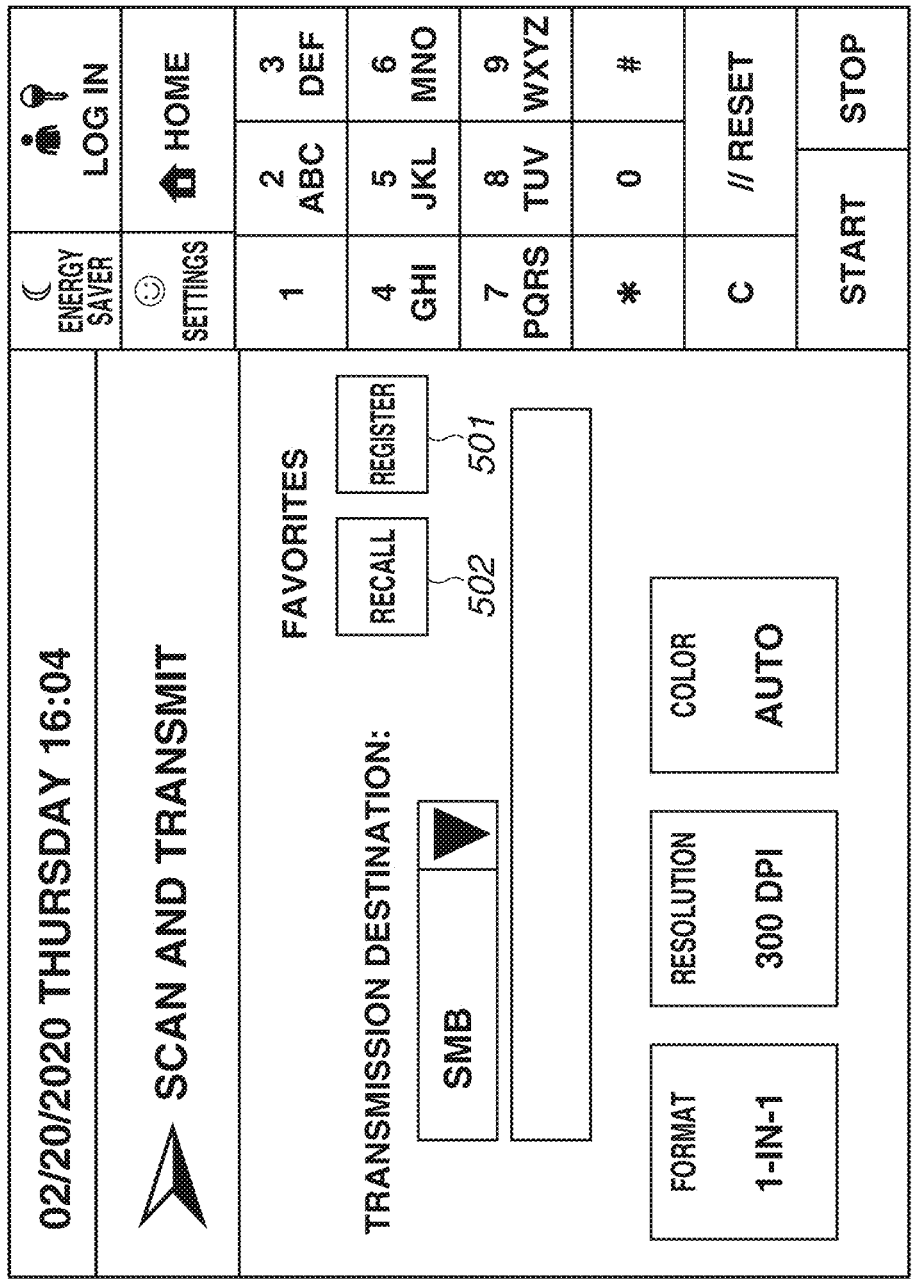
FIG. 5 illustrates a scan and storage screen.

FIG. 5 illustrates a display example of the screen for the scan application that is displayed when the scan and transmission button 322 is selected.

In FIG. 5, the screen includes buttons for a transmission destination setting such as the electronic mail address or the path of the file server to which the scanned document is transmitted, a format setting for specifying the storage format of the scanned document, a resolution setting for specifying the scanning resolution, and the like. In addition thereto, this screen also includes a button for a color setting for specifying in which mode the document is read, in color, in monochrome, in gray-scale, or based on an automatic selection.

(Favorite Settings)

FIG. 6 illustrates an example of a favorite management table for managing the favorite settings.

The favorite settings refer to a combination of a function (an application) and a setting value group frequently used in this function, and this combination is managed using an identifier (ID) in FIG. 6. These favorite settings allow one or more user(s) to easily recall such favorites when the MFP 101 is used without requiring the login as a precondition therefor.

When a favorite registration button 401 or 501 is operated in FIG. 4 or 5, the setting value group set on the screen at this time can be registered as one of new favorite settings.

Further, in FIG. 4 or 5, when a recalling button 402 or 502 is operated, the favorite registered so far is recalled and the group of setting values included in the favorite setting is reflected on the screen. If a plurality of favorite settings is already registered with respect to each function, the user is supposed to manually select an arbitrary favorite setting from among them.

For example, "the number of copies: 1, the n-in-1 setting: 2-in-1, the two-sided printing setting: two-sided, and the color setting: monochrome" are registered as "favorite setting 1" in advance to save paper in the copy function. In this case, suppose that the defaults of the copy function are 1 for the number of copies, 1-in-1 for the n-in-1 setting, one-side for the two-sided printing setting, and color for the color setting. When the "favorite setting 1" are recalled, the group of the setting values included in the favorite setting is applied, and the number of copies set to 1, the n-in-1 setting set to 2-in-1, the two-sided printing setting set to two-sided, and the color setting set to monochrome are also reflected on the displayed screen. For a setting value not specified by the user as the favorite setting, the default value of this function is used.

For example, in a case where the user always uses fixed transmission settings for the scan and transmission function, the user registers "the format: Joint Photographic Experts Group (JPEG), the transmission destination: SMB\\172.20.83.168\folder, and the resolution: 400 dots per inch (dpi)" as favorite setting 2. In this case, suppose that the default setting of the scan and transmission function is empty for the transmission destination setting, JPEG for the format setting, 300 dpi for the resolution setting, and automatic selection for the color setting. When the favorite setting 2 is selected using the recalling button 502, the setting value group registered as the favorite setting 2 will be applied similarly to the above-described copy function.

Referring to FIG. 6, the favorite management table includes a favorite ID field 601, and a unique identifier for identifying the registered favorite is stored therein. The favorite management table includes a function field 602, and information for identifying the function (the application) is stored therein. The favorite management table includes a setting field 603, and the setting value group registered as the favorite is stored therein.

A record 610 is an example of the above-described favorite 1 of the copy function. An ID "F0001", the function name "copy", and the setting value group "the number of copies: 1, the n-in-1 setting: 2-in-1, the two-sided printing setting: two-sided, and the color setting: monochrome" are stored in the favorite ID field 601, the function field 602, and the setting field 603, respectively. A record 611 is an example of the above-described favorite setting 2 of the scan and transmission function. An ID "F0005" is stored in the favorite ID field 601. The function name "scan and transmission" is stored in the function field 602, and the setting value group "the format: JPEG, the transmission destination: SMB\\172.20.83.168\folder, the resolution: 400 dpi, and the color setting: automatic" is stored in the setting field 603.

(Regarding Recalling of Shortcut from Home Screen)

The shortcut refers to a function usable to recall the favorite setting from the home screen displayed on the MFP 101. One or more shortcut(s) can be registered with the MFP 101.

A combination of a function (an application) desired to be recalled and the setting value group of this function is registered in each shortcut. One favorite setting managed in FIG. 6 can also be registered in one shortcut.

On the MFP 101, when one shortcut is selected on the home screen, the function (the application) registered with respect to this shortcut is started up, and the application screen is presented in the state that the setting value group corresponding to this shortcut is applied thereto. When wanting to newly register a shortcut, the user can start it by selecting the "+" button 323 from the home screen illustrated in FIG. 3.

An example of registering the shortcut of the copy application will be described with reference to FIGS. 7A and 7B.

Figure 7A:
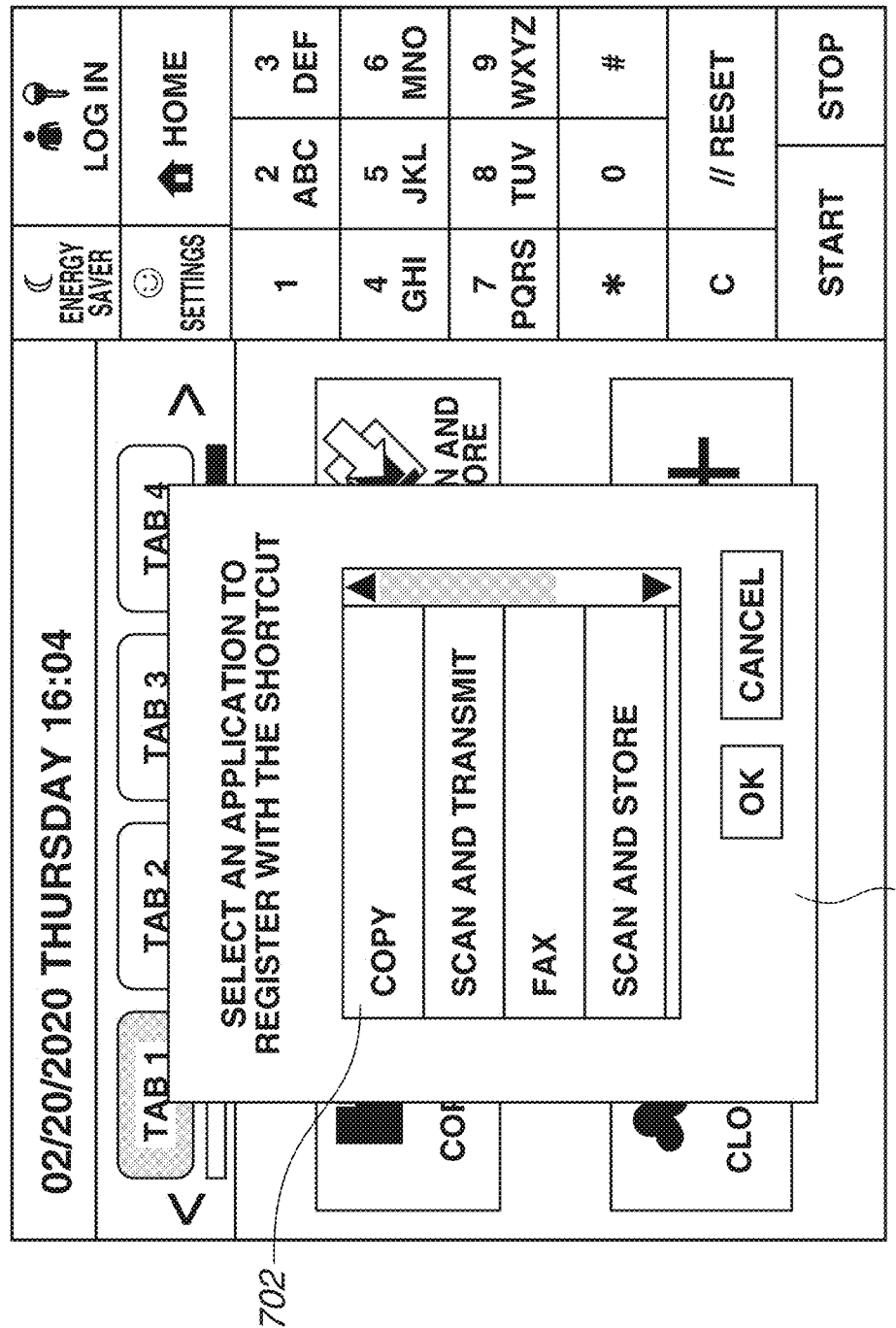

When the "+" button 323 is operated from the home screen, a screen 701 illustrated in FIG. 7A is displayed. The screen 701 indicates a list of applications usable for the shortcut that are installed in the MFP 101. In the present example, a copy 702 is selected from this list and an OK button is selected. By this operation, a shortcut regarding the copy function can be newly added.

Returning back to the home screen after the shortcut is registered, an added shortcut button 710 is displayed as illustrated in FIG. 7B. When the shortcut button 710 is operated, the screen of the copy function will be displayed in the state that the setting value group (for example, arbitrary favorite setting) associated when the shortcut is registered is applied thereto.

FIG. 8 illustrates an example of a shortcut management table for managing the shortcut.

The shortcut management table includes a shortcut ID field 801, and a unique identifier for identifying the shortcut is stored therein. The shortcut management table includes a function field 802, and the identification information of the function (application) executed based on the shortcut is stored therein. The shortcut management table includes a recall favorite field 803, and the ID of the favorite setting (the value of the favorite ID 601) managed in FIG. 6 is stored therein. The shortcut management table includes a location field 804, and a location indicating where the shortcut is registered on the home screen is stored therein. A record 810 is an example of the above-described registration of the shortcut of the copy function. A unique ID "S0001" and the function name "copy" are stored in the shortcut ID field 801 and the function field 802, respectively. The favorite ID "F0001" is registered in the recall favorite field 803. A location "tab 1:8" indicating the eighth button in the tab 1, which is the location of the shortcut button 710 on the home screen, is stored in the location field 804.

The tables illustrated in FIGS. 6 and 8 may be structured in such a manner that, for example, an ID unique for each function is stored in the function fields 602 and 802 in these tables instead of the function name.

If a plurality of favorite settings is already registered with respect to the application specified when the shortcut is registered, the MFP may display a list selection screen on which the user can select and specify the favorite setting that the user wants to recall based on this shortcut.

The shortcut according to the present exemplary embodiment can be registered in association with the card information independently of the user information or the like of the login user. For example, the user may carry an arbitrary card such as a transportation-related IC card besides the IC card used to log into the MFP 101. In this case, preregistering the shortcut in association with the card information of the transportation-related IC card read via the IC card reader 131 allows the user to easily recall this shortcut without logging in. In this case, the user information does not have to be further registered in association with the shortcut.

Regarding the card information of the IC card for use in the login to the MFP 101, the registration of the card information can also be limited to, for example, when this card information is registered in association with the shortcut or the shortcut is registered by being imported.

(Recalling of Shortcut Using IC Card)

As described above, according to the present exemplary embodiment, the card information can be registered in association with the shortcut. For example, when the home screen is displayed, the MFP 101 can recall the shortcut corresponding to the card information that can be read when the IC card is held over the IC card reader 131. For example, even the shortcut registered in the selection region 320 corresponding to a tab not currently displayed on the display device 119 can also be easily recalled only by holding the IC card over the IC card reader 131 without performing the operation for switching the tab.

An example of associating the card information with the shortcut button will be described with reference to FIGS. 9A and 9B. For example, selecting the shortcut button 710 displayed on the display device 119 and causing a management screen to be displayed can start processing for, for example, registering the card information in association with this shortcut or deleting this association.

Figure 9A:
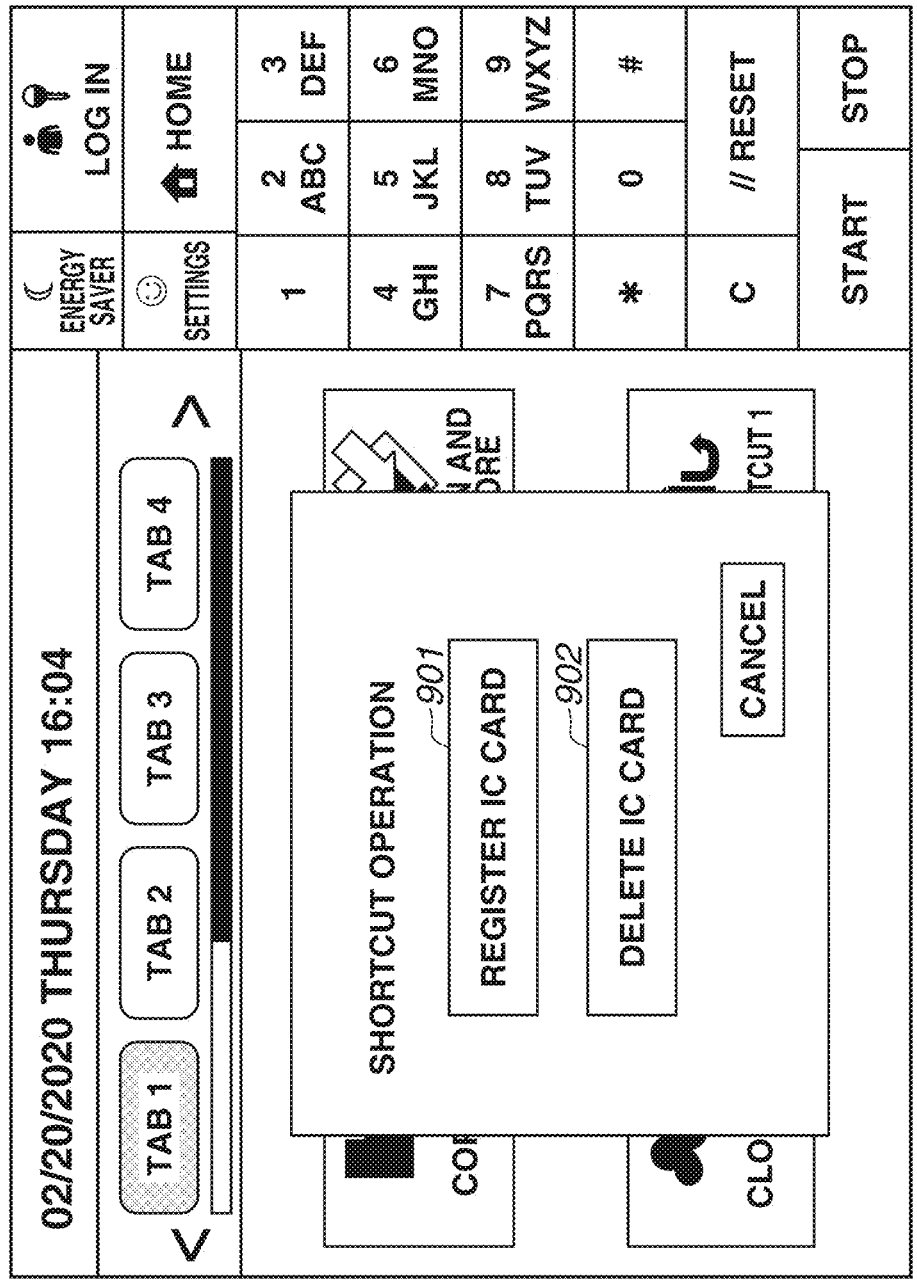
FIGS. 9A and 9B illustrate an integrated circuit (IC) card management screen.

A management screen 900 illustrated in FIG. 9A is displayed. The management screen 900 includes an IC card registration button 901 and an IC card deletion button 902. When the IC card registration button 901 is operated, an IC card registration screen illustrated in FIG. 9B is displayed. When the user holds the arbitrary IC card over the IC card reader 131, the card information of the IC card held over the IC card reader 131 is read and the present shortcut is registered in association with the card information. For example, any of a serial number, a card ID, and the like can be used as the card information. Besides them, any unique information readable from the IC card can be used.

When the user operates the IC card deletion button 902 from the management screen 900, the card information registered in association with the present shortcut is deleted.

FIG. 10 illustrates an IC card management table managing the association between the card information and the shortcut. The IC card management table includes a card ID field 1001, and the card information is stored therein. The IC card management table includes a shortcut ID field 1002, and the shortcut ID 801 of the shortcut recalled in correspondence with the read card information is stored therein. A record 1010 indicates such an example that card information "03BAF394AE277C80" is registered in association with "S0001" indicating the shortcut button 710.

The present exemplary embodiment can also be realized by additionally registering the card information so as to further associate it in the management table illustrated in FIG. 8, instead of the configuration like the example illustrated in FIG. 10.

(Recalling of Favorite using IC Card on Application Screen)

Figure 9B:
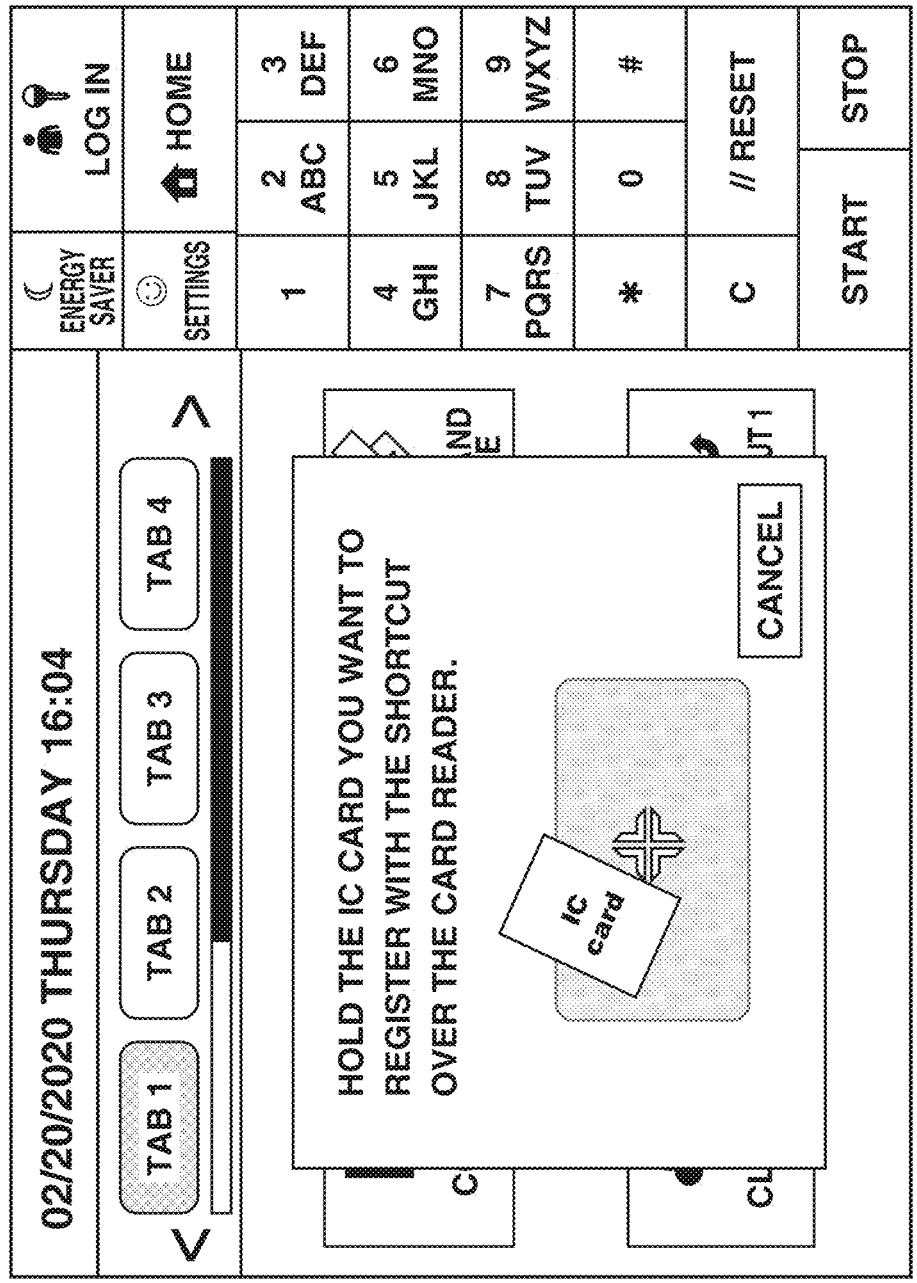
Figure 11A:
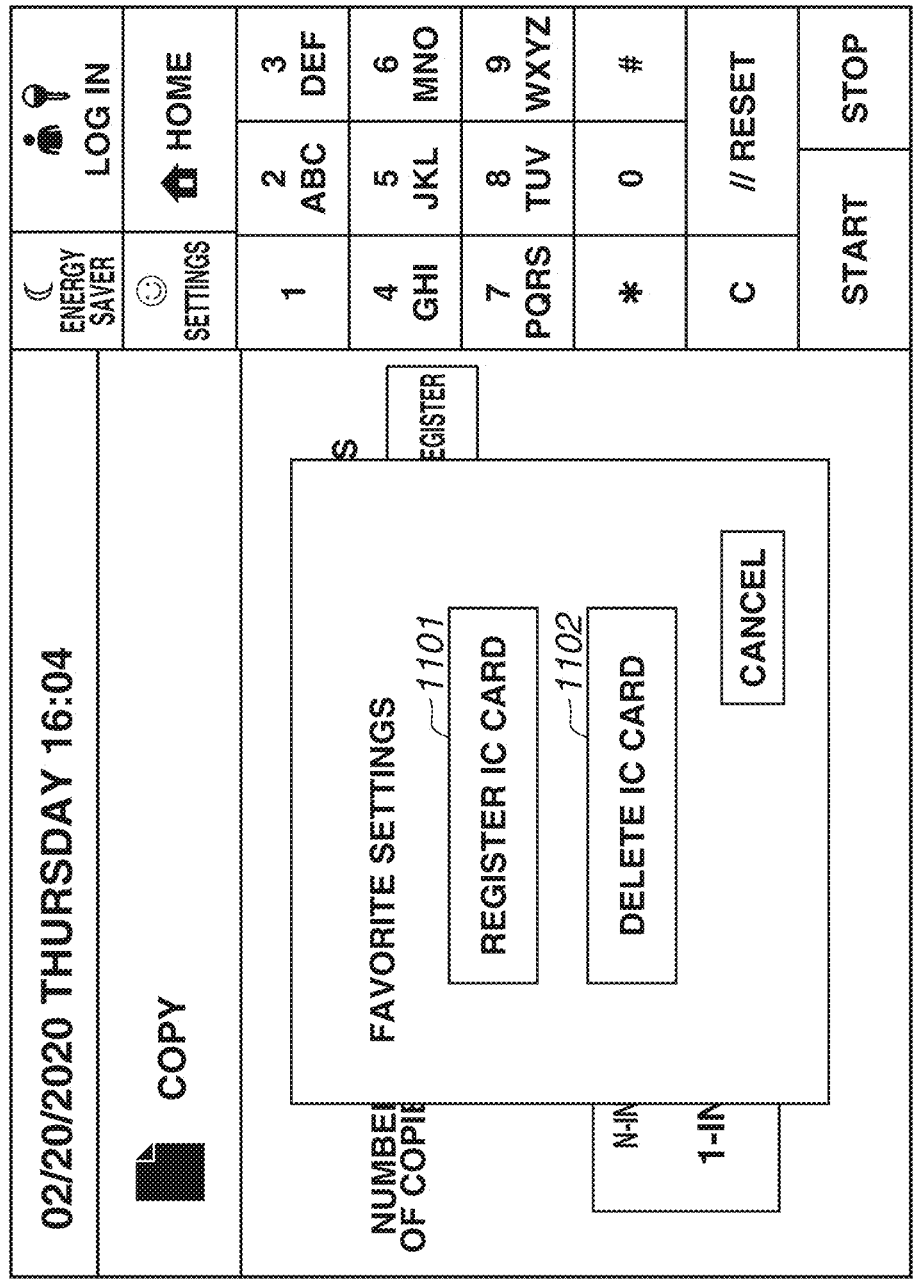

FIGS. 11A and 11B illustrate registration processing that is to be performed on the MFP 101 in advance to recall the favorite setting associated with the card information on the application screen unlike the control on the home screen illustrated in FIGS. 9A and 9B.

The present registration processing allows the favorite setting corresponding to the card information read from the IC card to be easily recalled when the IC card is held over the IC card reader 131 while the application screen corresponding to each function is displayed on the MFP 101.

When the shortcut is recalled, the screen is presented in the state that the corresponding setting value group is applied thereto with the display switched from the home screen to the corresponding application screen.

In the case where the favorite setting corresponding to the card information is recalled on the application screen, the screen will be updated in the state that the setting value group of the recalled favorite setting is applied thereto with the function (the application) kept the same.

In the following description, the specific registration processing will be described.

For example, an IC card management screen illustrated in FIG. 11A can be displayed by holding down the registration button 401 on the application screen. The IC card management screen illustrated in FIG. 11A includes an IC card registration button 1101 and an IC card deletion button 1102.

FIG. 11B illustrates an IC card registration screen displayed when the IC card registration button 1101 is selected and operated. When the user holds the arbitrary IC card over the IC card reader 131, the card information of the IC card held over the IC card reader 131 is read. The read card information will be registered as the favorite setting for the present function (application) in association with the setting value group (for example, the favorite setting identified by the favorite ID 601) currently displayed on the application screen.

FIG. 12 illustrates an example of a management table for managing the association between the favorite setting and the card information. This management table includes a card ID field 1201, and the card information is stored therein. The management table includes a favorite ID field 1202, and the favorite ID 601 of the favorite setting recalled in correspondence with the card information is stored therein. The management table includes a function field 1203, and the function name is stored therein.

When the IC card is held over the IC card reader 131 while the application screen is displayed, the card information is read out. Then, if an associated favorite setting is stored in the management table illustrated in FIG. 12, the setting value group thereof will be recalled and applied.

For a record 1210, the card information "03BAF394AE277C80" is stored in the card ID field 1201. The identifier "F0001", which is the identifier of the favorite setting registered with the favorite management table illustrated in FIG. 6, is stored in the favorite ID field 1202. The function name "copy" is stored in the function field 1203.

When the IC card deletion button 1102 is selected and operated in FIG. 11A, the favorite setting registered with respect to the present function (application) and the record regarding the card information associated therewith are deleted.

(Restriction on Use of Application by Authentication)

The MFP 101 can identify the user by authenticating him/her and restrict the execution of the function (application) user by user. As an example of the restriction, the MFP 101 can prohibit a user unregistered with a system where the authentication is not conducted from using a specific function (copying or faxing) of the MFP 101. In this case, the home screen illustrated in FIG. 3 is presented with the copy button and the fax button inoperable before the user is authenticated.

Besides that, the MFP 101 can also restrict the usage by setting an upper limit on the number of available uses for each authenticated user.

The authentication can be conducted by a method that causes the user to manually input the username and the password by operating the login button 301. Another possible method is to associate the user information with the card information of the IC card in advance, read the card information by causing the user to hold the IC card over the IC card reader 131, and then identify the user information. In this case, the user does not have to operate the login button 301.

When the authentication function is enabled, the MFP 101 cannot determine whether the IC card is held over for the authentication or the IC card is held over for recalling the shortcut when the user holds the IC card over the IC card reader 131 while the home screen is displayed. Therefore, in the present exemplary embodiment, the MFP 101 can also restrict the recalling of the shortcut using the card information from the home screen to prioritize the user management when the authentication function is enabled. The MFP 101 can also be designed to recall the favorite setting corresponding to the card information when the IC card is held over, while the application screen is displayed even when the authentication function is enabled.

(Details of Processing for Recalling Shortcut or Favorite Setting using Card Information)

The processing for recalling the shortcut or the favorite setting using the card information will be described with reference to a flowchart illustrated in FIG. 13.

The processing illustrated in FIG. 13 will be described assuming that this processing is performed by the display operation control unit 201, the authentication control unit 202, the IC card control unit 210, the favorite control unit 211, and the control unit of each application. These kinds of processing are performed by the CPU 111 controlling one or more program(s) stored in the ROM 113. The application control unit refers to the control unit that controls the application according to each function, such as the copy control unit 205 and the transmission control unit 204.

In step S1301, the IC card control unit 210 reads the card information via the IC card reader 131. Then, the favorite control unit 211 acquires the read card information.

In step S1302, the favorite control unit 211 confirms whether the screen currently displayed on the display device 119 of the MFP 101 is the home screen. The favorite control unit 211 requests the display operation control unit 201 and acquires the screen currently displayed on the display device 119. The favorite control unit 211 determines whether the acquired screen is the home screen. If the currently displayed screen is the home screen (YES in step S1302), the processing proceeds to step S1303. If the currently displayed screen is not the home screen (NO in step S1302), the processing proceeds to step S1308. In step S1302, the favorite control unit 211 may determine whether the screen currently displayed on the display device 119 is the home screen or the screen corresponding to an application (a function) for which the favorite setting can be registered. If the screen currently displayed on the display device 119 is the home screen (YES in step S1302), the processing proceeds to step S1303. If the screen currently displayed on the display device 119 is the screen corresponding to an application (a function) for which the favorite setting can be registered (NO in step S1302), the processing proceeds to step S1308.

In step S1303, the favorite control unit 211 inquires of the authentication control unit 202 about the state of the authentication function and determines whether this function is enabled. In this case, the favorite control unit 211 may determine whether the function of the authentication using the IC card is enabled. If the authentication function is determined to be enabled (YES in step S1303), the processing proceeds to step S1304, in which the authentication control unit 202 acquires the card information and performs the authentication processing. Then, the present processing ends. If the authentication function is determined not to be enabled (NO in step S1303), the processing proceeds to step S1305. Further, the determination about whether the authentication function is enabled in step S1303 may be made before step S1302. In this case, if the authentication function is determined to be enabled (YES in step S1303), the processing will proceed to step S1304 and then the processing illustrated in FIG. 13 will end. On the other hand, if the authentication function is disabled (NO in step S1303), the processing will proceed to step S1305 or step S1308 according to the determination processing in step S1302 after that.

In step S1305, the favorite control unit 211 reads in the IC card management table exemplarily illustrated in FIG. 10 and refers to it. In step S1306, the favorite control unit 211 determines whether the card information acquired in step S1301 is registered as the card ID 1001 in the IC card management table and is stored therein. If the card information acquired in step S1301 is determined to be stored in the table (YES in step S1306), the processing proceeds to step S1307. If this card information is not stored in the table (NO in step S1306), the present processing ends.

In step S1307, the favorite control unit 211 recalls the shortcut corresponding to the card information acquired in step S1301. More specifically, the favorite control unit 211 identifies the associated favorite setting from FIG. 8 using the shortcut ID of the shortcut corresponding to the card information acquired in step S1301. Further, the favorite control unit 211 identifies the favorite setting from the table illustrated in FIG. 6 based on the favorite ID stored in the recall favorite field 803 identified in FIG. 8. After that, the MFP 101 displays the application screen corresponding to the function name identified in FIG. 8 on the display device 119 in the state that the setting value group of the identified favorite setting is applied thereto. With this display, the recalling of the shortcut is completed, and the present processing ends.

In step S1308, the favorite control unit 211 reads in the favorite management table exemplarily illustrated in FIG. 12 and refers to it. In step S1309, the favorite control unit 211 determines whether the card information acquired in step S1301 is registered as the card ID 1201 in the favorite management table and is stored therein. If the card information acquired in step S1301 is determined to be stored in the table (YES in step S1309), the processing proceeds to step S1310. If this card information is not stored in the table (NO in step S1309), the present processing ends.

In step S1310, the favorite control unit 211 determines whether the currently displayed application (function) screen and the function name stored in the function 1203 of the record matching the card information acquired in step S1301 correspond to each other. If they are determined to correspond to each other (YES in step S1310), the processing proceeds to step S1311. If they are determined not to correspond to each other (NO in step S1310), the present processing ends without recalling the favorite setting.

In step S1311, the favorite control unit 211 recalls the favorite setting corresponding to the record matching the card information acquired in step S1301. More specifically, the favorite control unit 211 reads out the value stored as the favorite ID 1202 corresponding to the card information acquired in step S1301 from the management table illustrated in FIG. 12. Further, the favorite control unit 211 identifies the favorite setting corresponding to the read value from the favorite management table illustrated in FIG. 6. After that, the currently displayed application screen is updated into the state that the setting value group of the identified favorite setting is applied thereto. With this display, the recalling of the favorite setting is completed, and the present processing ends.

Second Exemplary Embodiment

The present exemplary embodiment will be described as an exemplary embodiment to which the first exemplary embodiment is improved. In the following description, differences from the first exemplary embodiment will be described in detail.

The differences are summarized as follows. (1) The recalling of the shortcut is attempted when the acquired card information is not associated with any favorite setting while the application screen is displayed. Further, (2) the screen transitions to another application screen and the favorite setting is applied if the displayed function and the function of the favorite setting registered in association with the acquired card information do not correspond to each other while the application screen is displayed.

Figure 13:
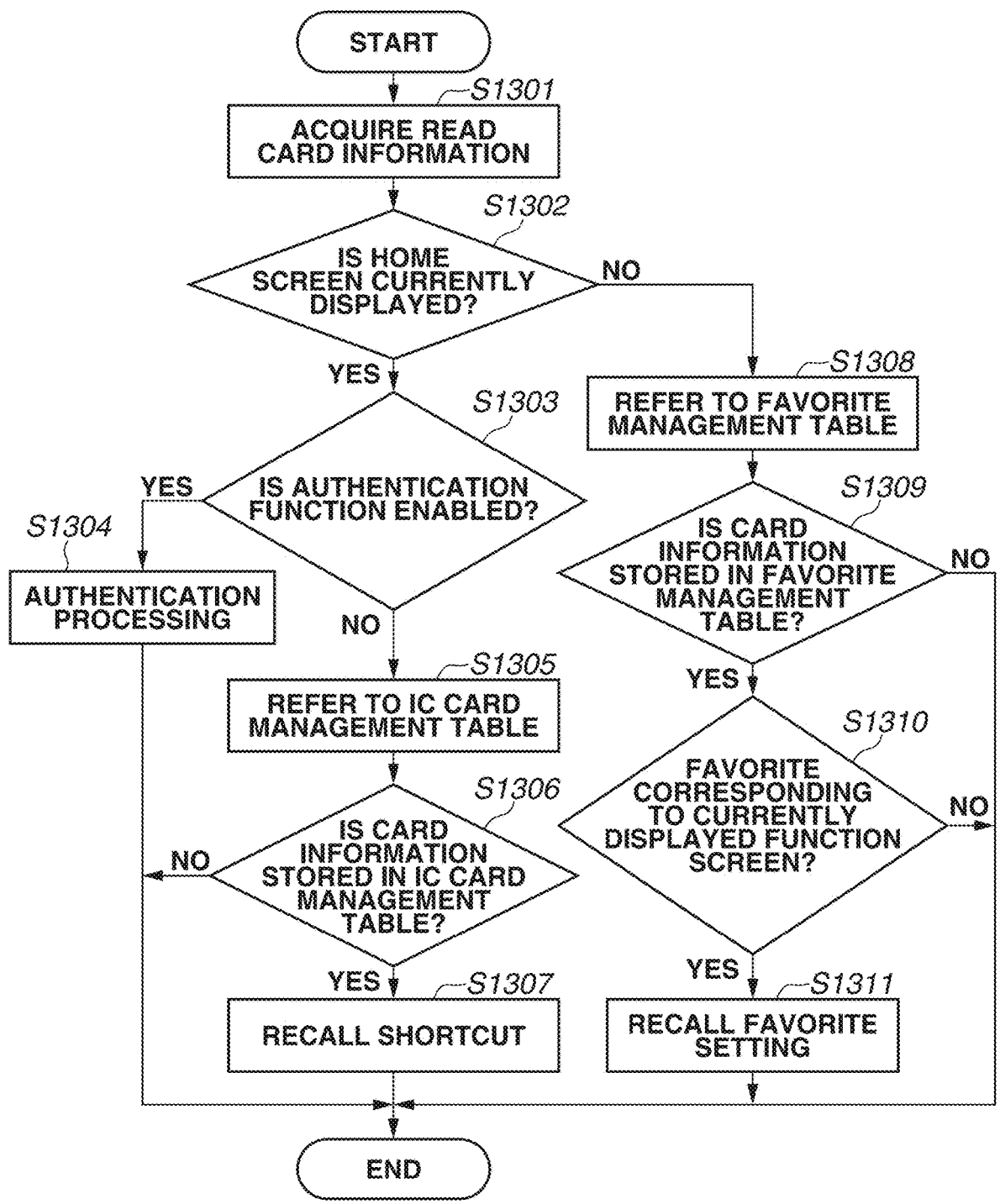
FIG. 13 is a flowchart illustrating processing regarding use of shortcut information according to a first exemplary embodiment.
Figure 14:
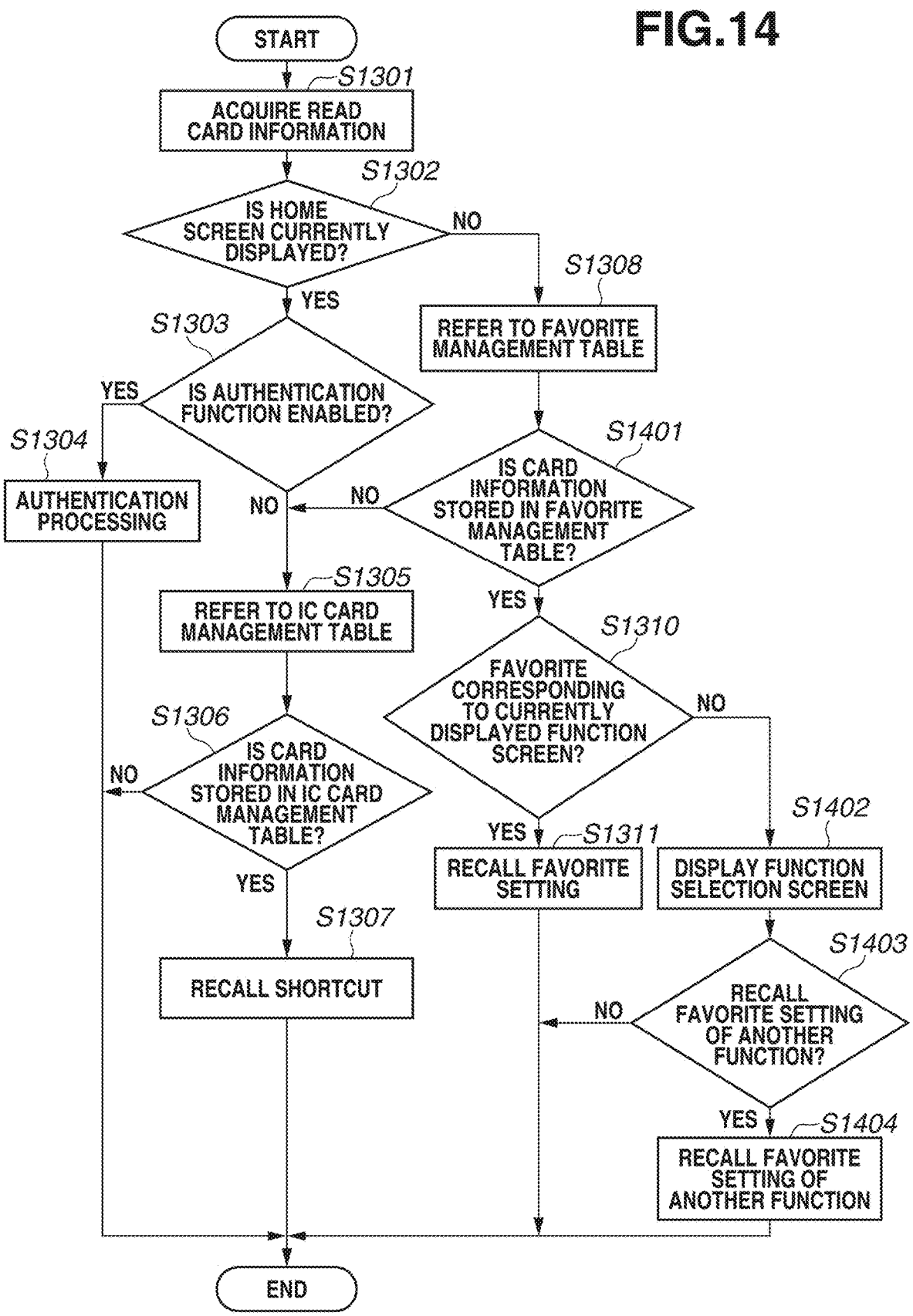
FIG. 14 is a flowchart illustrating processing regarding the use of the shortcut information according to a second exemplary embodiment.

FIG. 14 is a flowchart to which the processing illustrated in FIG. 13 is improved, and will be described assigning the same step number to similar processing. Regarding the above-described two improvements, the present exemplary embodiment may be configured to apply both of them to the MFP 101 as illustrated in FIG. 14, or can also be configured to apply only any one of them to the MFP 101. Further, the present exemplary embodiment can also be configured to manage a setting about whether to enable or disable each of the two improvements by the MFP 101.

Processing specific to the present exemplary embodiment will be described with reference to FIG. 14.

In step S1401, the favorite control unit 211 determines whether the card information acquired in step S1301 is registered as the card ID 1201 in the favorite management table and is stored therein. If the card information acquired in step S1301 is determined to be stored in the table (YES in step S1401), the processing proceeds to step S1310. If this card information is not stored in the table (NO in step S1401), the processing proceeds to step S1305.

Figure 15:
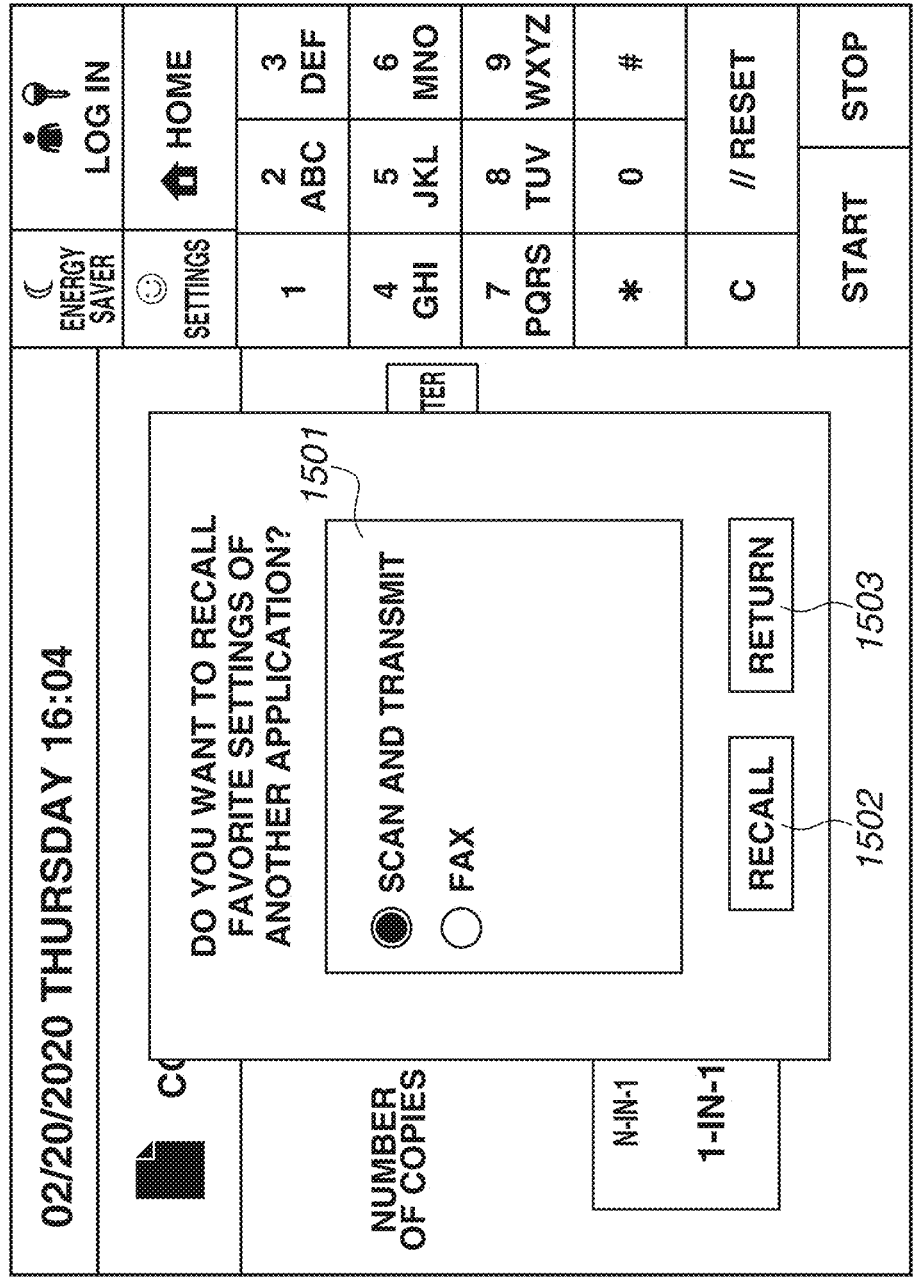
FIG. 15 illustrates recalling of the favorite setting of another application according to the second exemplary embodiment.

Further, in step S1402, the favorite control unit 211 identifies the function name stored in the function 1203 of the record matching the card information acquired in step S1301 in the management table illustrated in FIG. 12, and instructs the display operation control unit 201 to display a function selection screen illustrated in FIG. 15 on the display device 119.

In FIG. 15, two options 1501, "scan and transmit" and "fax", which are displays corresponding to the identified two function names, are displayed. If wanting to display any of the application screens and apply the favorite setting thereto, the user selects and operates a recalling button 1502 after specifying any of the functions. If not using another application screen, the user selects and operates a return button 1503.

If the favorite control unit 211 determines that the return button 1503 is selected in step S1403, the present processing ends. On the other hand, if the favorite control unit 211 determines that the recalling button 1502 is selected, the processing proceeds to step S1404.

In step S1404, the favorite control unit 211 identifies the function and the favorite setting corresponding to the record matching the card information acquired in step S1301. More specifically, the favorite control unit 211 identifies the values stored in the favorite ID 1202 and the function 1203 corresponding to the card information acquired in step S1301 from the management table illustrated in FIG. 12. Further, the favorite control unit 211 identifies the favorite setting corresponding to the read values from the favorite management table illustrated in FIG. 6. After that, the display operation control unit 201 displays the application screen of another function corresponding to the identified function on the display device 119 in the state that the setting value group of the identified favorite setting is applied thereto.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-063781, filed Mar. 31, 2020, which is hereby incorporated by reference herein in its entirety.

What is claimed is:

1. An image processing apparatus configured to be able to read card information from a card and provide at least a function using a scanner or a function using a printer, the image processing apparatus comprising:
a display device, wherein a home screen can be displayed on the display device, the home screen including a button for selecting a screen for a function provided by the image processing apparatus;
at least one memory storing instructions; and
at least one processor executing the instructions causing the information processing apparatus to:
manage a combination of the function provided by the image processing apparatus and a setting value group used in the function as first information in association with the card information,
manage a combination of the function provided by the image processing apparatus and a setting value group used in the function as second information in association with the card information, and
perform display control on the display device, wherein first control is performed as the display control in a case where the card information managed as the first information is read while the home screen is displayed, the first control being configured to display the screen for the function corresponding to the card information in a state that the corresponding setting value group is applied to the displayed screen, and
wherein second control is performed as the display control in a case where the card information managed as the second information is read while the screen for the function provided by the image processing apparatus is displayed, the second control being configured to display the screen after updating the currently displayed screen into a state that the setting value group corresponding to the card information is applied to the displayed screen.

2. The image processing apparatus according to claim 1, wherein the first control is performed in a case where an authentication function is not enabled in the image forming apparatus and the card information managed as the first information is read while the home screen is displayed.

3. The image processing apparatus according to claim 1, wherein the first control is not performed even when the card information managed as the first information is read while the home screen is displayed in a case where an authentication function is enabled in the image processing apparatus.

4. The image processing apparatus according to claim 3, wherein the second control is performed in a case where the authentication function is enabled and the card information managed as the second information is read while the screen for the function provided by the image processing apparatus is displayed.

5. The image processing apparatus according to claim 1, wherein the first control is also performed in a case where the card information managed as the first information is read while the screen for the function provided by the image processing apparatus is displayed.

6. An image processing apparatus configured to be able to read card information from a card and provide a plurality of functions including at least a function using a scanner or a function using a printer, the image processing apparatus comprising:
a display device, wherein a screen for each of functions provided by the image processing apparatus can be displayed on the display device;
at least one memory storing instructions; and
at least one processor executing the instructions causing the information processing apparatus to:
manage a combination of the function provided by the image processing apparatus and a setting value group used in the function as second information in association with the card information, and
perform display control on the display device,
wherein, as the display control, (1) in a case where the card information managed as the second information and associated with a first function is read while a screen for the first function provided by the image processing apparatus is displayed, the control is performed so as to update the currently displayed screen into a state that the setting value group corresponding to the card information is applied to the displayed screen, and (2) in a case where the card information managed as the second information and associated with the first function is read while a screen for a second function provided by the image processing apparatus is displayed, the control is performed so as to display the screen for the first function corresponding to the card information in a state that the corresponding setting value group is applied to the displayed screen.

7. A method in an image processing apparatus configured to be able to read card information from a card and provide at least a function using a scanner or a function using a printer, the image processing apparatus including a display device on which a home screen can be displayed, the home screen including a button for selecting a screen for a function provided by the image processing apparatus, the method in the image processing apparatus comprising:
    managing a combination of the function provided by the image processing apparatus and a setting value group used in the function as first information in association with the card information;
    managing a combination of the function provided by the image processing apparatus and a setting value group used in the function as second information in association with the card information; and
    performing display control on the display device,
    wherein first control is performed as the display control in a case where the card information managed as the first information is read while the home screen is displayed, the first control being configured to display the screen for the function corresponding to the card information in a state that the corresponding setting value group is applied to the displayed screen, and
    wherein second control is performed as the display control in a case where the card information managed as the second information is read while the screen for the function provided by the image processing apparatus is displayed, the second control being configured to display the screen after updating the currently displayed screen into a state that the setting value group corresponding to the card information is applied to the displayed screen.

8. A method in an image processing apparatus configured to be able to read card information from a card and provide a plurality of functions including at least a function using a scanner or a function using a printer, the image processing apparatus including a display device on which a screen for each of functions provided by the image processing apparatus can be displayed, the method in the image processing apparatus comprising:
    managing a combination of the function provided by the image processing apparatus and a setting value group used in the function as second information in association with the card information; and
    performing display control on the display device,
    wherein, as the display control, (1) in a case where the card information managed as the second information and associated with a first function is read while a screen for the first function provided by the image processing apparatus is displayed, the control is performed so as to update the currently displayed screen into a state that the setting value group corresponding to the card information is applied to the displayed screen, and (2) in a case where the card information managed as the second information and associated with the first function is read while a screen for a second function provided by the image processing apparatus is displayed, the control is performed so as to display the screen for the first function corresponding to the card information in a state that the corresponding setting value group is applied to the displayed screen.

* * * * *